US012783286B2

(12) United States Patent
Choudhary et al.

(10) Patent No.: US 12,783,286 B2
(45) Date of Patent: Nov. 3, 2026

(54) PROCESSOR EXECUTION AWARE INTERRUPT ROUTING FOR SYMMETRIC MULTIPROCESSING (SMP) SYSTEMS

(71) Applicant: QUALCOMM Incorporated, San Diego, CA (US)

(72) Inventors: Dinesh Kumar Choudhary, Tonk (IN); Maulik Shah, Hyderabad (IN); Philip Geoffrey Derrin, Beecroft (AU)

(73) Assignee: QUALCOMM Incorporated, San Diego, CA (US)

( * ) Notice: Subject to any disclaimer, the term of this patent is extended or adjusted under 35 U.S.C. 154(b) by 39 days.

(21) Appl. No.: 18/929,361

(22) Filed: Oct. 28, 2024

(65) Prior Publication Data

US 2026/0119227 A1 Apr. 30, 2026

(51) Int. Cl.
*G06F 9/48* (2006.01)
*G06F 9/455* (2018.01)

(52) U.S. Cl.
CPC ........ *G06F 9/4831* (2013.01); *G06F 9/45558* (2013.01); *G06F 2009/4557* (2013.01)

(58) Field of Classification Search
CPC ............... G06F 9/4831; G06F 9/45558; G06F 2009/4557
See application file for complete search history.

(56) References Cited

U.S. PATENT DOCUMENTS 5,164,769 A * 11/1992 Hashimoto ............ G03G 15/50 399/361
7,809,876 B2 * 10/2010 Balasubramanian ........................ G05B 19/052 710/262
2015/0113193 A1 * 4/2015 de Cesare ............... G06F 13/24 710/267

FOREIGN PATENT DOCUMENTS

CN 102393823 B * 5/2018 ............... G06F 9/52
EP 2463781 A2 6/2012
TW 202345009 A * 11/2023 ........... G06F 9/5016

OTHER PUBLICATIONS

CN-102393823-B English translation (Year: 2018).*
Translation of TW-202345009-A (Year: 2023).*
Translation of CN-102393823-B (Year: 2018).*
International Search Report and Written Opinion—PCT/US2025/047423—ISA/EPO—Feb. 13, 2026.

* cited by examiner

*Primary Examiner* — Henry Tsai
*Assistant Examiner* — John B Roche
(74) *Attorney, Agent, or Firm* — Seyfarth Shaw LLP

(57) ABSTRACT

An interrupt routing method includes receiving an incoming interrupt. The method also includes assigning the incoming interrupt to a selected processor core of a set of processor cores based on a current processor running state of each processor core of the set of processor cores. The current processor running state of each processor core indicates whether a respective processor core is running a routine preventing processing of the incoming interrupt.

20 Claims, 6 Drawing Sheets

PROCESSOR EXECUTION AWARE INTERRUPT ROUTING FOR SYMMETRIC MULTIPROCESSING (SMP) SYSTEMS

BACKGROUND

Field

Aspects of the present disclosure relate to multiprocessing computing devices, and more specifically to processor execution aware interrupt routing to boost performance and stability of the computing devices including multiple processors.

Background

Mobile or portable computing devices include mobile phones, laptop, palmtop and tablet computers, portable digital assistants (PDAs), portable game consoles, and other portable electronic devices. Mobile computing devices are comprised of many electrical components that consume power and generate heat. The components (or compute devices) may include system-on-a-chip (SoC) devices, graphics processing unit (GPU) devices, neural processing unit (NPU) devices, digital signal processors (DSPs), and modems, among others.

Computing devices, including mobile computing devices, automotive devices, and Internet of things (IoT) devices may include many different hardware blocks or peripherals that generate a large number of interrupt requests. It would be desirable to efficiently route such interrupt requests to improve system stability and system performance.

SUMMARY

In aspects of the present disclosure, an interrupt routing method includes receiving an incoming interrupt. The method also includes assigning the incoming interrupt to a selected processor core of a set of processor cores based on a current processor running state of each processor core of the set of processor cores. The current processor running state of each processor core indicates whether a respective processor core is running a routine preventing processing of the incoming interrupt.

Other aspects of the present disclosure are directed to an apparatus. The apparatus has one or more memories and one or more processors coupled to the memory. The processor(s) is configured to receive an incoming interrupt. The processor(s) is also configured to assign the incoming interrupt to a selected processor core of a set of processor cores based on a current processor running state of each processor core of the set of processor cores. The current processor running state of each processor core indicates whether a respective processor core is running a routine preventing processing of the incoming interrupt.

In other aspects of the present disclosure, a non-transitory computer-readable medium with program code recorded thereon is disclosed. The program code is executed by a processor and includes program code to receive an incoming interrupt. The program code also includes program code to assign the incoming interrupt to a selected processor core of a set of processor cores based on a current processor running state of each processor core of the set of processor cores. The current processor running state of each processor core indicates whether a respective processor core is running a routine preventing processing of the incoming interrupt.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

Figure 1:
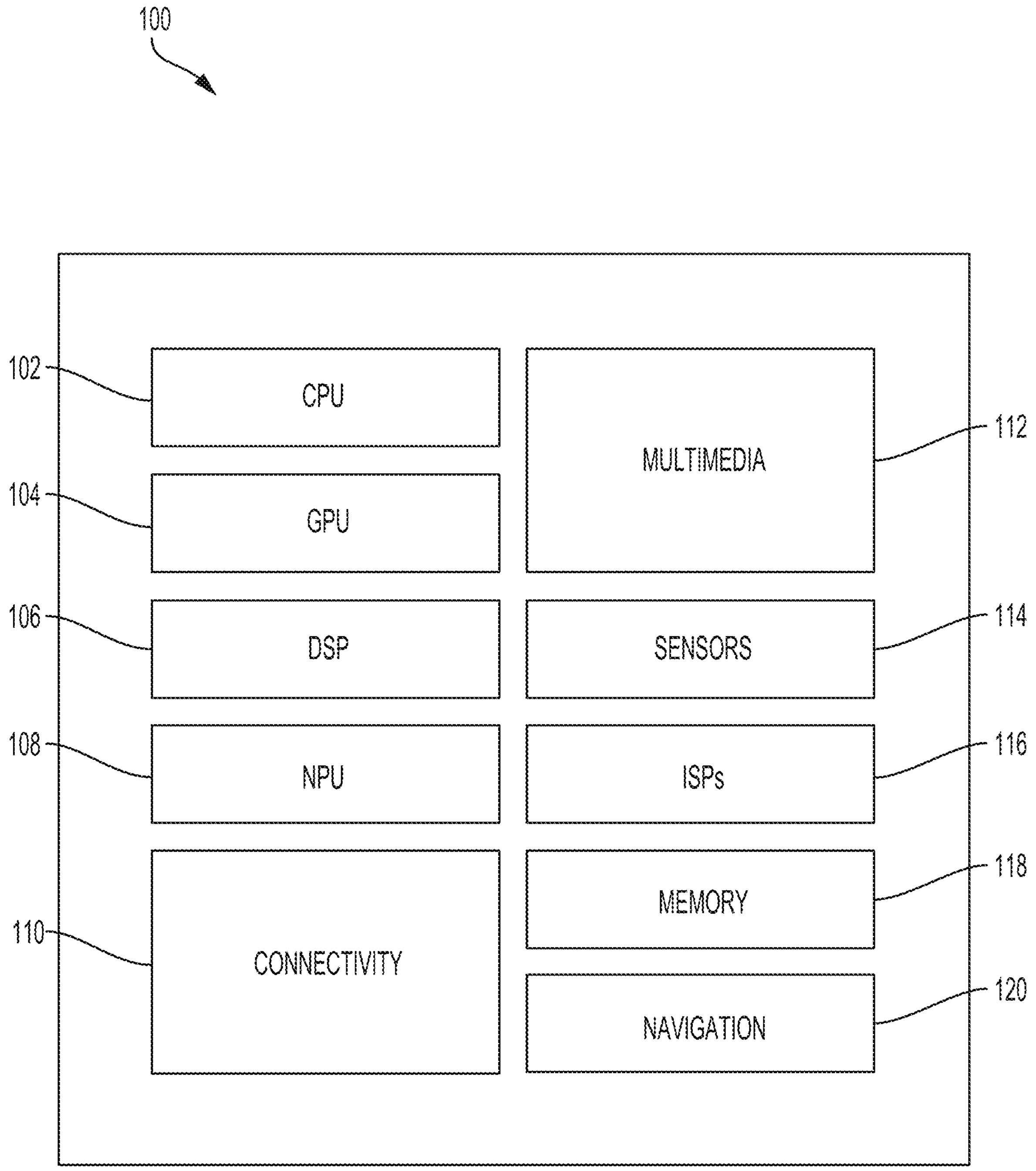
FIG. 1 illustrates an example implementation of a host system-on-a-chip (SoC), including an improved interrupt controller, in accordance with various aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. It will be apparent, however, to those skilled in the art that these concepts may be practiced without these specific details. In some instances, well-known structures and components are shown in block diagram form in order to avoid obscuring such concepts.

As described, the use of the term "and/or" is intended to represent an "inclusive OR," and the use of the term "or" is intended to represent an "exclusive OR." As described, the term "exemplary" used throughout this description means "serving as an example, instance, or illustration," and should not necessarily be construed as preferred or advantageous over other exemplary configurations. As described, the term "coupled" used throughout this description means "connected, whether directly or indirectly through intervening connections (e.g., a switch), electrical, mechanical, or otherwise," and is not necessarily limited to physical connections. Additionally, the connections can be such that the objects are permanently connected or releasably connected. The connections can be through switches. As described, the term "proximate" used throughout this description means "adjacent, very near, next to, or close to." As described, the term "on" used throughout this description means "directly on" in some configurations, and "indirectly on" in other configurations.

Computing systems include many different hardware blocks or peripherals. The hardware blocks may request system level operations at run-time, while working in tandem with multiple processors and peripherals. System level operations may include activating and deactivating voltage regulators and system clocks. System level operations may also include frequency scaling and power scaling, such as setting different power rails at different voltages. Whenever any request is asserted from a high-level operating system (HLOS) to these hardware blocks, the high-level operating system expects a response within a stipulated time in order to continue further execution.

Response from these hardware blocks are interrupt based, which means that once a request is honored, the hardware blocks generate interrupts destined for a central processing unit (CPU) subsystem. The interrupt can be delivered to any of the processors present in the system, but if the interrupt is generated and not handled by the expected processing core within the stipulated time, then a timer interrupt generates a system level reset as the critical request could not be completed in time. In some cases, the system crashes.

At a virtual CPU (vCPU) level for virtual machines (VMs), currently a virtual machine monitor (e.g., a hypervisor) is not able to detect stalled interrupt request (IRQ) handling within a virtual CPU, nor does hardware detect such stalled IRQ handling. As a result, the hypervisor does not redirect an IRQ to a different core because the IRQ is waiting for other IRQs to process. More generally, a vCPU is running non-preemptable execution of routines, and only post completion the IRQ can be processed. Virtual CPUs are threads created on the physical processor.

Aspects of the present disclosure bring system awareness about a processor's current state during IRQ handling. The awareness improves overall system performance. If finite state machine (FSM) processing indicates a target routed interrupt has not been processed within a predetermined period of time, an interrupt controller cancels the delivery of the IRQ and reroutes the interrupt to another processor, as recommended in an updated 1:N scheme. The updated 1:N routing recommends one or more cores based on a recommended cores list that considers the processing core state, e.g., whether the processing core is running critical routines, along with other factors such as whether a core is enabled/disabled, an efficiency class, and an idle state. The hypervisor performs the physical interrupt handling and delivers a virtual interrupt to a vCPU at a VM based on the dynamic state of the vCPU running in the VM. The hypervisor may implement a timer-based approach for vCPU level interrupt handling, similar to the FSM approach.

With numerous interrupt lines in a system with multiple processors, aspects of the present disclosure facilitate processor prioritization for servicing interrupt routines, avoiding potential queuing on processors that would cause performance issues (e.g., a stall) or a stability issue (e.g., a timeout) for time bound processes or routines in the system. Shared interrupts targeted to specific processors, if not serviced within a stipulated time, can be rerouted to other virtual processor instances to improve overall interrupt handling timelines.

FIG. 1 illustrates an example implementation of a host system-on-a-chip (SoC) 100, which includes an improved interrupt controller (see FIG. 2), in accordance with aspects of the present disclosure. The host SoC 100 includes processing blocks tailored to specific functions, such as a connectivity block 110. The connectivity block 110 may include fifth generation (5G) connectivity, fourth generation long term evolution (4G LTE) connectivity, Wi-Fi connectivity, universal serial bus (USB) connectivity, Bluetooth® connectivity, Secure Digital (SD) connectivity, and the like.

In this configuration, the host SoC 100 includes various processing units that support multi-threaded operation. For the configuration shown in FIG. 1, the host SoC 100 includes a multi-core central processing unit (CPU) 102, a graphics processor unit (GPU) 104, a digital signal processor (DSP) 106, and a neural processor unit (NPU) 108. The host SoC 100 may also include a sensor processor 114, image signal processors (ISPs) 116, a navigation module 120, which may include a global positioning system (GPS), and a memory 118. The multi-core CPU 102, the GPU 104, the DSP 106, the NPU 108, and the multi-media engine 112 support various functions such as video, audio, graphics, gaming, artificial networks, and the like. Each processor core of the multi-core CPU 102 may be a reduced instruction set computing (RISC) machine, an advanced RISC machine (ARM), a microprocessor, or some other type of processor. The NPU 108 may be based on an ARM instruction set.

Computing systems include many different hardware blocks or peripherals. The hardware blocks may request system level operations at run-time, while working in tandem with multiple processors and peripherals (e.g., subsystems). System level operations may include activating, scaling up, scaling down, and deactivating voltage regulators and system clocks. System level operations may also include frequency scaling and power scaling, such as setting different power rails at different voltages. Whenever any request is asserted from a high-level operating system (HLOS) to these hardware blocks, the high-level operating system expects a response within a stipulated time in order to continue further execution. The amount of time is peripheral specific. In one example, if a mouse is connected, the mouse needs respective clock or voltage supplies to be enabled within a certain time. If the timing is not met, the user may experience a delay when operating the mouse.

In some cases, the processor cores present in the system are not malfunctioning, but rather, execution is delayed because the targeted processor core is running a critical process. As a result, the interrupt service routine (ISR) execution is delayed, potentially causing a fatal error. Increasing timeouts for the responses for the peripheral may negatively impact the end-user experience or system performance.

Two levels of interrupt routing exist: first, an interrupt controller (e.g., hardware or a generic interrupt controller (GIC)) routes the interrupt to a specific CPU or one of the recommended CPUs based on the configuration a particular interrupt has set (e.g., targeted or 1:N). Second, once the interrupt is handled at the hypervisor level, the hypervisor further routes (e.g., with a similar routing algorithms as the hardware/GIC level) to a vCPU running in a respective VM where interrupt routines are expected to be serviced. It is noted that vCPUs are threads created on a physical CPU and running in different VMs. For example, the physical CPU may have three threads created for running in three different VMs (x, y, and z). If VMx and VMy have no work then they trigger idle state on their vCPUs, but if VMz has some work running, the physical CPU continues to run even though the vCPUs based on the physical CPU for VMx and VMy are in sleep mode. That is, the physical CPU follows the aggregated state of all vCPUs created on the physical CPU.

At the physical CPU level, multiple interrupt routing parameters are considered for more quickly processing interrupts. Routing may be based on: whether processing cores are active or collapsed, whether processing cores are enabled or disabled, and/or efficiency classes of the available processing cores. Even with these parameters, scenarios still exist where interrupts are delivered to processors already handling a critical routine, causing the interrupt request (IRQ) to stall until the critical requests are finished processing. A processor core is considered to be running a critical routine when the core is already executing an ISR, or a high priority IRQ is queued at the core, in which cases the IRQ is masked to avoid preemption. Until the IRQ is unmasked, the interrupt is stalled and can only be handled once the core finishes the critical routine.

At a virtual CPU (vCPU) level for virtual machines, currently, the hypervisor is not able to detect stalled IRQ handling within a virtual CPU, nor does hardware detect such stalled IRQ handling. As a result, the hypervisor does not redirect an IRQ to a different core because the IRQ is waiting for other IRQs to be handled or a spinlock to be released. A spinlock is a locking mechanism where a processing thread waits in a loop until a core releases the lock. The hypervisor only redirects an IRQ to a different core if the originally targeted vCPU has IRQ delivery disabled at the generic interrupt controller (GIC) level, for example, in suspend or resume paths, or has been pre-empted by a different virtual machine (VM). Neither of those events happens always for the hypervisor to detect the vCPU state. An interrupt may also be referred to as a serial peripheral interface (SPI) or a peripheral routine.

Figure 2:
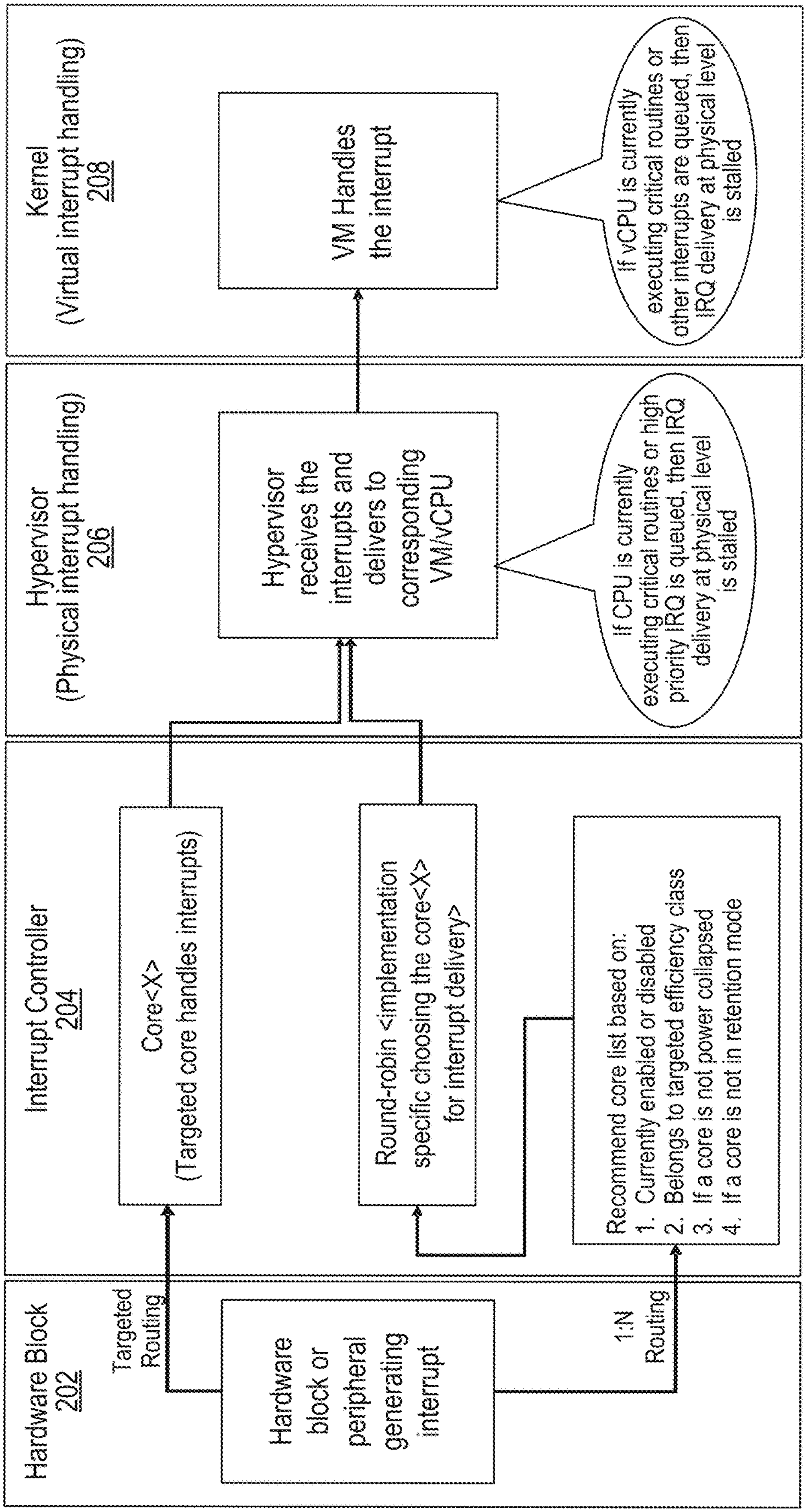
FIG. 2 is block diagram illustrating interrupt routing for physical and virtual interrupt handling.

FIG. 2 is a block diagram illustrating interrupt routing for physical and virtual interrupt handling. In the example of FIG. 2, a hardware block 202 (e.g., a peripheral) generates an interrupt for processing by an interrupt controller 204. The interrupt controller 204 processes the interrupt from the hardware block 202 by routing the interrupt to a hypervisor 206. If the hardware block 202 recommends a specific core, the targeted core handles the interrupt. If the hardware block 202 does not select a specific core, 1:N routing occurs where the interrupt controller 204 selects which core to route to based on a recommended core list. With 1:N routing, the interrupt controller 204 determines the recommended core list based on whether each core is currently enabled or disabled, whether each core belongs to a targeted efficiency class, whether each core is power collapsed, and whether each core is in retention mode. Round-robin processing (or a similar technique) selects a core from the list for routing the interrupt.

The hypervisor 206 receives the interrupt from the interrupt controller 204 based on the targeted or round-robin routing and delivers the interrupt to a corresponding virtual machine (VM) and virtual CPU in a kernel 208 for virtual handling of the interrupt. If a core is currently executing a critical routine, or a high priority IRQ is queued at the core, then IRQ delivery stalls at the physical level. The kernel 208 handles virtual interrupts with a virtual machine (VM). If a vCPU is currently executing critical routines or other interrupts are queued, then IRQ delivery stalls at the physical level. As noted previously, the physical CPU follows the aggregated state from all vCPUs created on the physical CPU. A physical level finite state machine (FSM) coordinates with an interrupt controller to determine a stall, and further at the virtual level either the hypervisor can implement similar logic as the FSM or can direct feedback from the vCPU to determine whether a vCPU has a masked IRQ.

Aspects of the present disclosure bring awareness about a processor's current state during IRQ handling. The awareness is present during physical interrupt delivery at non-secure exception level two (NS EL2) and virtual interrupt delivery at the kernel level (NS EL1). The awareness improves overall system performance. The execution level (EL) or privilege level is specified in a system where multiple VMs can be running. All the VMs may be running in NS EL1, whereas hypervisor runs in EL2. Hypervisor coordinates all scheduling or low power mode (lpm) aggregations or extended virtualization. The hypervisor is the last layer that has visibility into the physical state of the core and the first layer that drives virtualization.

Figure 3:
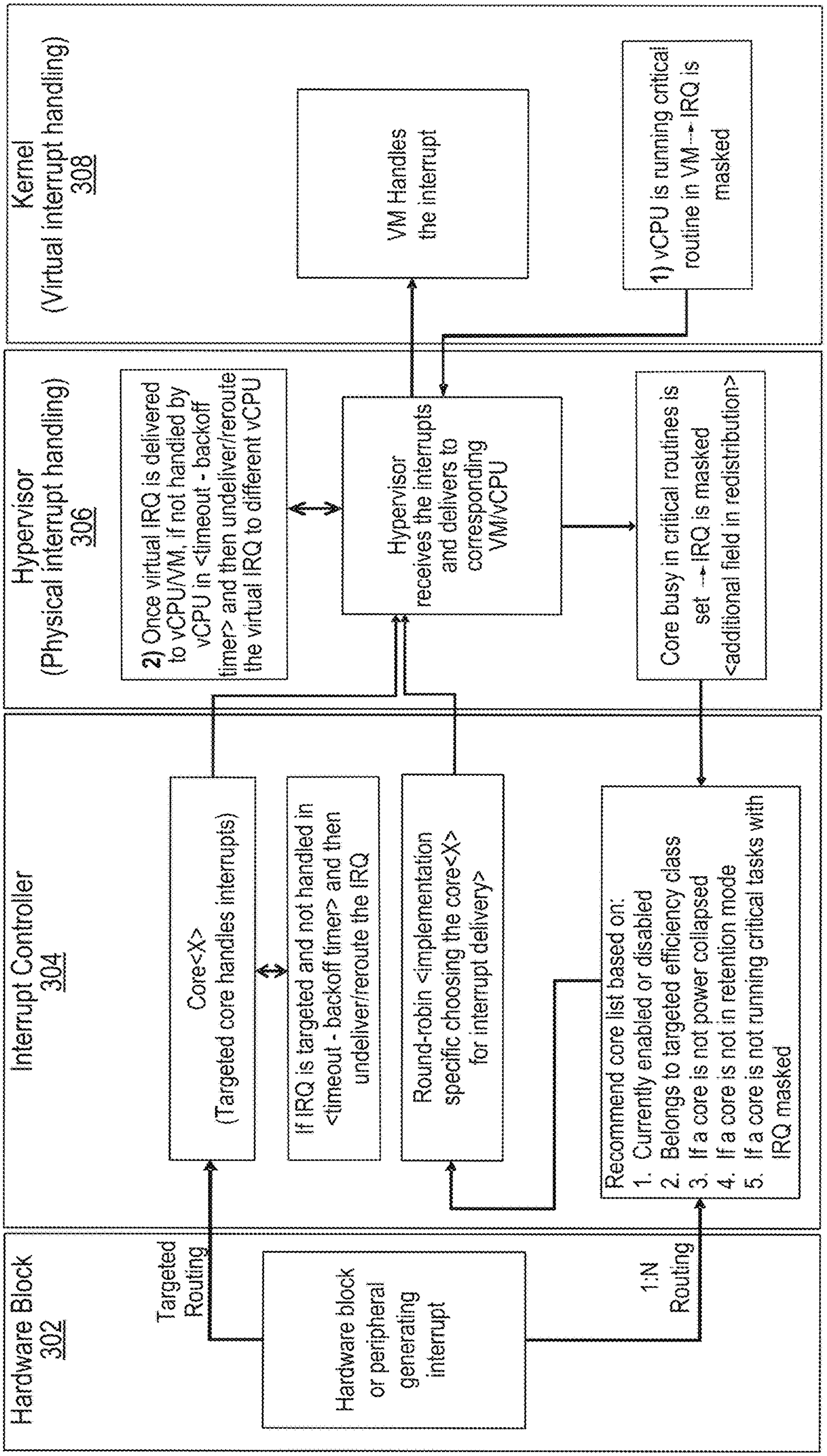
FIG. 3 is a block diagram illustrating interrupt routing for physical and virtual interrupt handling, in accordance with various aspects of the present disclosure.

FIG. 3 is a block diagram illustrating interrupt routing for physical and virtual interrupt handling, in accordance with various aspects of the present disclosure. In the example of FIG. 3, a hardware block 302 (e.g., a peripheral) generates an interrupt for processing by an interrupt controller 304. According to aspects of the present disclosure, if the interrupt is targeted to a specific core, a hardware finite state machine (FSM) determines whether delivery to the targeted core is handled within a predetermined period of time. The FSM operates with (but separately from) the interrupt controller 304 to make the determination. The predetermined time corresponds to a timeout (e.g., the stipulated time) minus a backoff time to ensure the timeout is not reached, which may crash the system. For example, if a timeout will occur at 1 millisecond, the predetermined period of time may be set to 900 microseconds to prevent the timeout from occurring. If the FSM processing indicates the interrupt has not been routed within the predetermined period of time, the interrupt controller 304 cancels the delivery (e.g., undelivers) of the IRQ and reroutes the interrupt to another processor, as recommended in an updated 1:N scheme. Thus, for targeted routing, the interrupt controller 304 honors the request from the hardware block 302. However, if the time is too long, the interrupt controller 304 reroutes the interrupt before a timeout occurs.

The updated 1:N routing recommends cores based on a recommended cores list that considers the processing core state, e.g., whether the processing core is running critical routines. The core state may be stored in a bit in a program status register (e.g., PSTATE.I), which indicates whether an IRQ is masked, or indicated by implementation defined bits from core specific purpose registers. PSTATE.I is a CPU register that indicates if IRQs are masked. Thus, the register may determine and publish this information at the hardware level. Other implementations may also indicate if a core is running with IRQs masked. In some aspects, the core state may be indicated to a core specific interrupt controller register (e.g., a generic interrupt controller register space). The recommended core list is also based on whether each core is currently enabled or disabled, whether each core belongs to a targeted efficiency class, whether each core is power collapsed, and whether each core is in retention mode. The interrupt controller 304 recommends processor cores for interrupt delivery in a round robin fashion (or some other mechanism) based on the recommended cores list.

A hypervisor 306 (e.g., in the recommended/targeted physical CPU) receives each interrupt delivered to any core based on the updated 1:N routing recommendation or the targeted routing. The hypervisor 306 performs the physical interrupt handling and delivers a virtual interrupt to a vCPU at a VM running in a kernel 308 based on the dynamic state of the vCPU running in the VM. That is, the hypervisor 306 checks vCPU states and if a vCPU is scheduled in a VM different from what was targeted or if the vCPU is running critical routines, then the hypervisor 306 routes the virtual interrupt to another available vCPU. Additionally or alternatively, the hypervisor 306 implements a timer-based approach for vCPU level interrupt handling. More specifically, once a virtual IRQ is delivered to a vCPU in a VM, the hypervisor 306 determines whether a predetermined time has elapsed, where the predetermined time is a timeout value minus a backoff time such that the virtual IRQ will not timeout. If the predetermined period of time is reached, the hypervisor 306 cancels the delivery of the virtual IRQ and reroutes the virtual IRQ to a different vCPU.

The hypervisor 306 indicates to the interrupt controller 304 that a processor core is busy (e.g., executing a critical routine such that IRQs are masked) with a bit in a register. For example, an additional field in a redistributor register of a generic interrupt controller (GIC) may indicate the busy state. In this implementation, the additional field is provided for each processor core. When a vCPU is running a critical routine in a VM (e.g., the IRQ is masked) the kernel 308 informs the hypervisor 306, which can then update the interrupt controller 304, for example, in the additional redistributor field. It is noted that although a single virtual machine (VM) 308 is shown in the example of FIG. 3, the present disclosure also contemplates multiple VMs that are running.

Current routing techniques target interrupts to a specific core. The targeting considers parameters such as: core current idle state, efficiency class, and/or whether a core enabled or disabled. Current techniques, however, do not consider the current processor core running state if the core is already handling interrupts or running critical routines causing the system to stall. Aspects of the present disclosure continue to target the interrupt for a period of time (e.g., a timeout-backoff time) at the top-level recommendation due to power or performance criteria of the cores. If the interrupt is not handled by the period of time, the techniques of the present disclosure dynamically detect delay, cancels the delivery of the interrupt from the current core, and route the interrupt to a next recommended core. For non-targeted interrupts, an additional routing parameter is considered when generating a recommended core list. The additional parameter is the dynamic state of the core. Based on the recommended core list, an interrupt controller recommends an available core at the physical level. Once the interrupt is delivered to a physical core, the hypervisor further routes virtual machine specific interrupts based on a dynamic state of vCPUs running in the VM.

Thus, aspects of the present disclosure address issues in multiprocessor systems where a processor is busy with a critical routine and unable to handle other interrupts, but still receives an interrupt. Aspects also address issues in virtualized systems where a hypervisor delivers interrupts to respective virtual CPUs running as threads on a physical instance.

The techniques of the present disclosure are applicable on all systems-on-a-chip (SoCs) having multiprocessor subsystems and hardware blocks present for system level operations. Multiprocessor systems are in place in many types of devices, e.g., handheld, compute, auto or Internet of things (IoT) devices, etc. Merged interrupts usually keep the processor cores busy as multiple sources can generate frequent interrupts. Aspects of the present disclosure prevent stalls in these types of systems.

According to aspects of the present disclosure, a multiprocessor computing device includes interrupt routing components. The interrupt routing components may include means for receiving, means for assigning, means for setting, means for storing, means for checking, means for routing, and means for rerouting. In one configuration, the receiving means, the assigning means, the setting means, the storing means, the checking means, the routing means, and the rerouting means may be the hardware block 302, interrupt controller 304, kernel 308, hypervisor 306, CPU 102, GPU 104, DSP 106, NPU 108, and/or memory 118, as shown in FIGS. 1 and 3. In other aspects, the aforementioned means may be any structure or any material configured to perform the functions recited by the aforementioned means.

Figure 4:
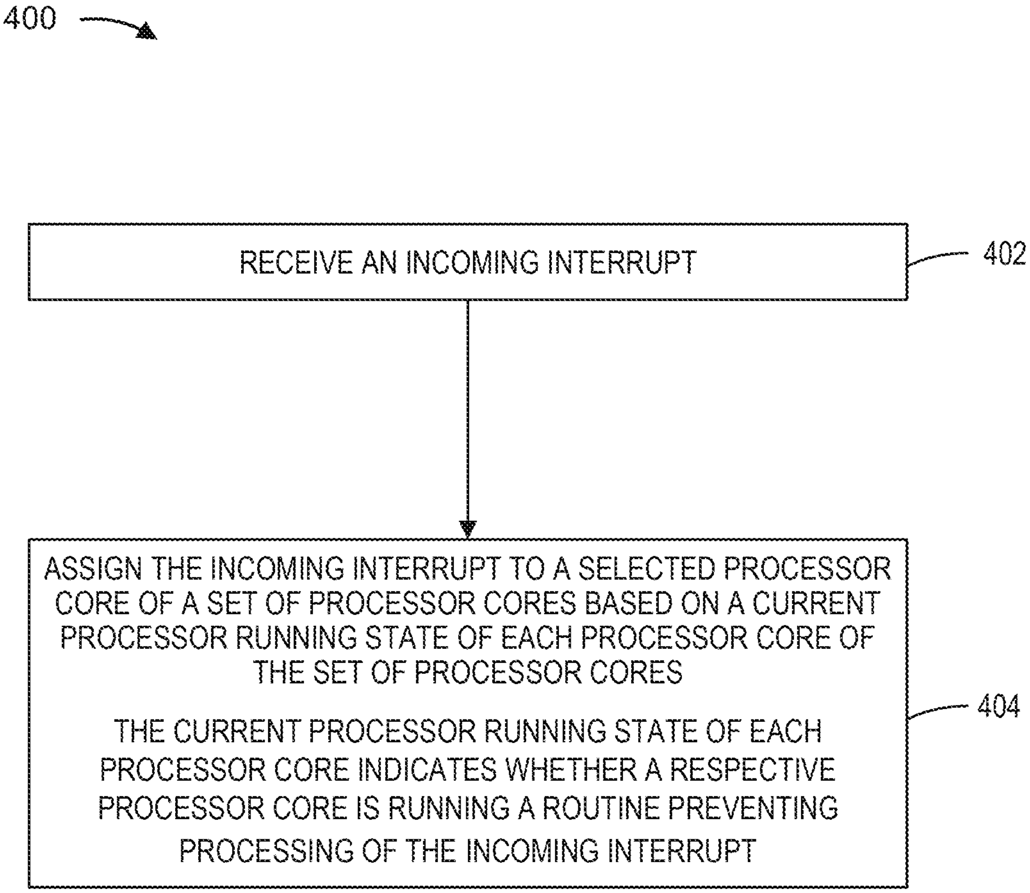
FIG. 4 is a flow diagram illustrating an example process performed, for example, by a multiprocessor computing device, in accordance with various aspects of the present disclosure.

FIG. 4 is a flow diagram illustrating an example process 400 performed, for example, by a multiprocessor computing device, in accordance with various aspects of the present disclosure. The example process 400 is an example of processor execution aware interrupt routing.

As shown in FIG. 4, in some aspects, the process 400 may include receiving an incoming interrupt (block 402). The incoming interrupt may specify a target processing core, and the method may further comprise rerouting the incoming interrupt to a next processor core in response to the incoming interrupt not being serviced by the target specific processing core within a predetermined period of time.

In some aspects, the process 400 may include assigning the incoming interrupt to a selected processor core of a set of processor cores based on a current processor running state of each processor core of the set of processor cores. The current processor running state of each processor core indicates whether a respective processor core is running a routine preventing processing of the incoming interrupt (block 404). In some aspects, the method receives the current processor running state from each core specific interrupt controller corresponding to each processor core of the set of processor cores. The method may set the current processor running state in response to the selected processor core servicing the incoming interrupt.

Figure 5:
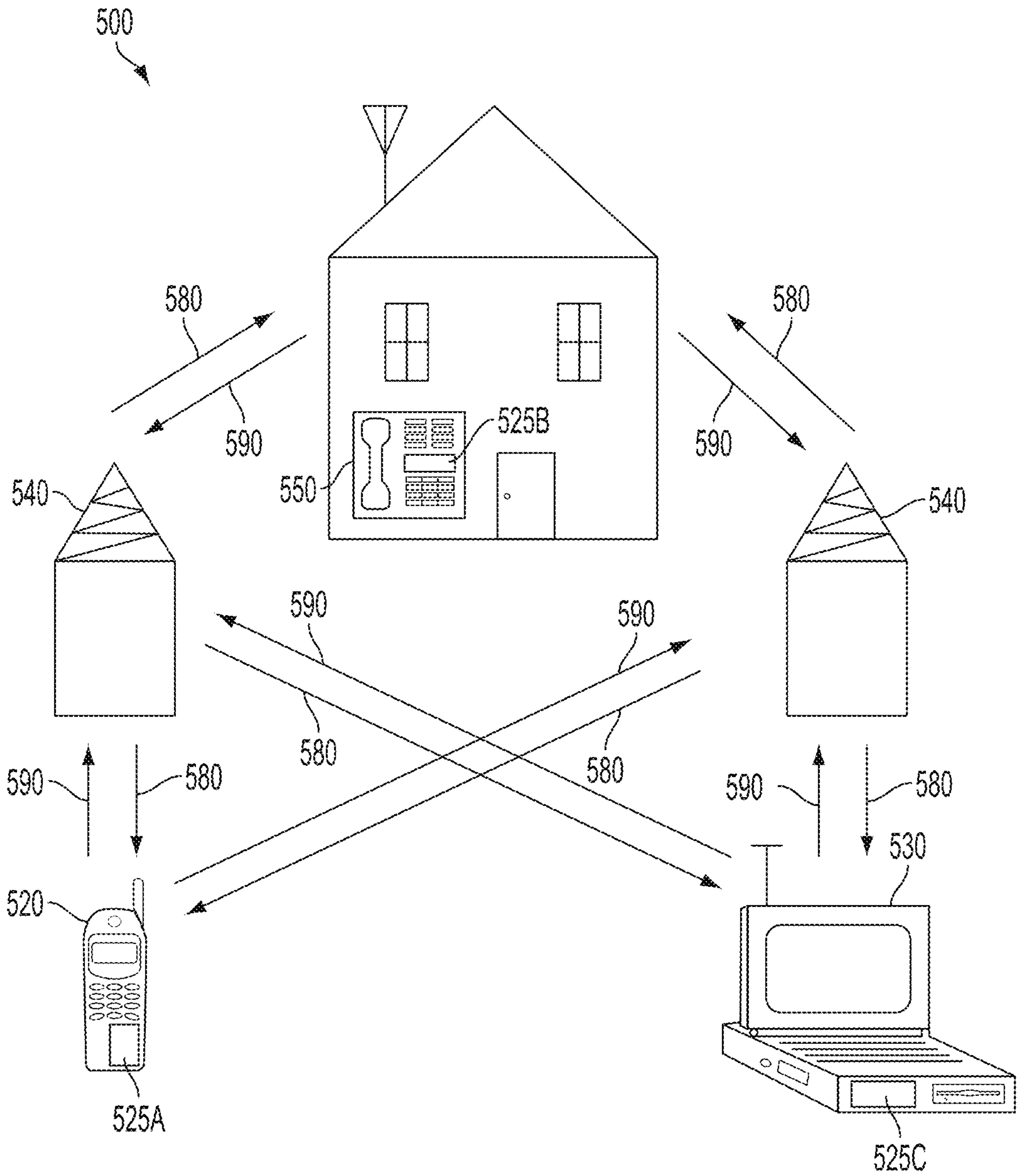
FIG. 5 is a block diagram showing an exemplary wireless communications system in which a configuration of the present disclosure may be advantageously employed.

FIG. 5 is a block diagram showing an exemplary wireless communications system 500, in which an aspect of the present disclosure may be advantageously employed. For purposes of illustration, FIG. 5 shows three remote units 520, 530, and 550, and two base stations 540. It will be recognized that wireless communications systems may have many more remote units and base stations. Remote units 520, 530, and 550 include integrated circuit (IC) devices 525A, 525B, and 525C that include the disclosed processor execution aware interrupt routing. It will be recognized that other devices may also include the disclosed processor execution aware interrupt routing, such as the base stations, switching devices, and network equipment. FIG. 5 shows forward link signals 580 from the base stations 540 to the remote units 520, 530, and 550, and reverse link signals 590 from the remote units 520, 530, and 550 to the base stations 540.

In FIG. 5, remote unit 520 is shown as a mobile telephone, remote unit 530 is shown as a portable computer, and remote unit 550 is shown as a fixed location remote unit in a wireless local loop system. For example, the remote units may be a mobile phone, a hand-held personal communication systems (PCS) unit, a portable data unit, such as a personal data assistant, a GPS enabled device, a navigation device, a set top box, a music player, a video player, an entertainment unit, a fixed location data unit, such as meter reading equipment, or other device that stores or retrieves data or computer instructions, or combinations thereof. Although FIG. 5 illustrates remote units according to the aspects of the present disclosure, the disclosure is not limited to these exemplary illustrated units. Aspects of the present disclosure may be suitably employed in many devices, which include the disclosed processor execution aware interrupt routing.

Figure 6:
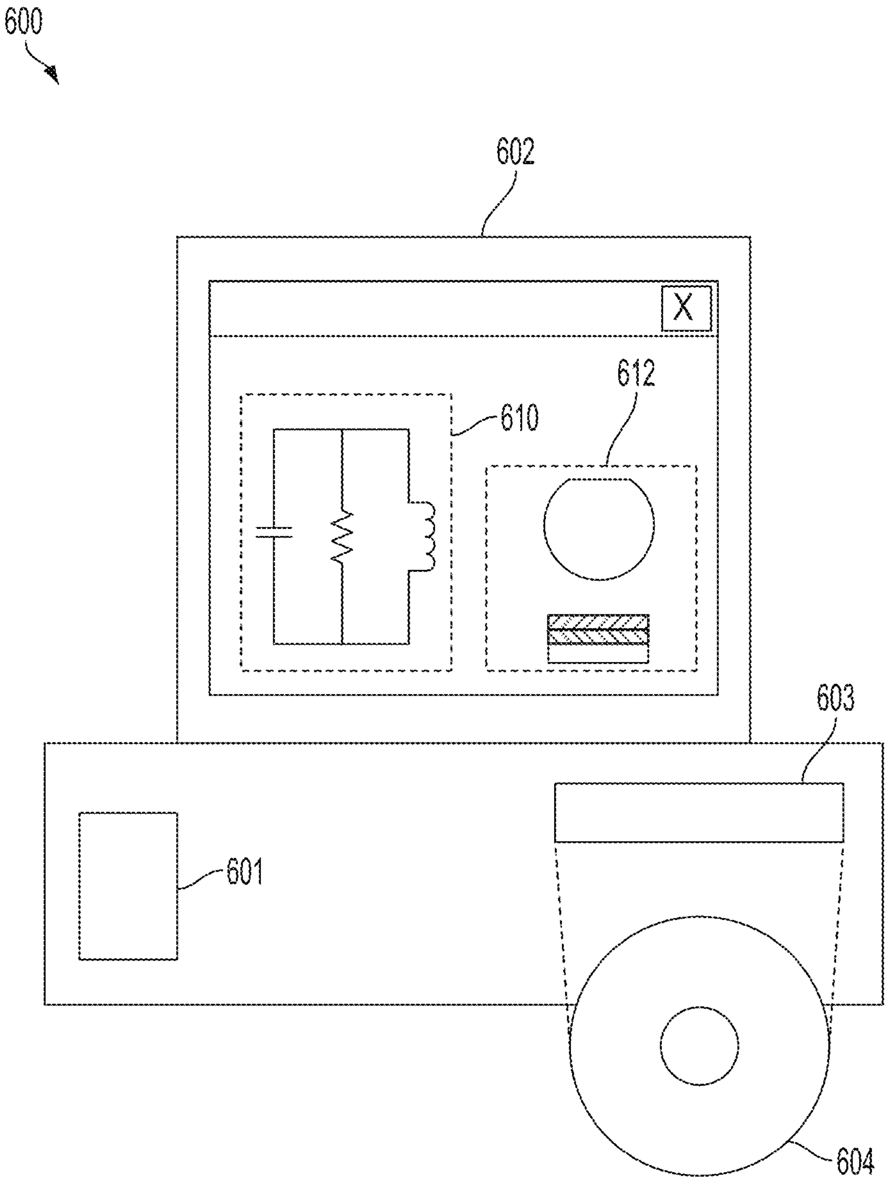
FIG. 6 is a block diagram illustrating a design workstation used for circuit, layout, and logic design of components, in accordance with various aspects of the present disclosure.

FIG. 6 is a block diagram illustrating a design workstation 600 used for circuit, layout, and logic design of a semiconductor component, such as the processor execution aware interrupt routing disclosed above. The design workstation 600 includes a hard disk 601 containing operating system software, support files, and design software such as Cadence or OrCAD. The design workstation 600 also includes a display 602 to facilitate design of a circuit 610 or a semiconductor component 612, such as the processor execution aware interrupt routing. A storage medium 604 is provided for tangibly storing the design of the circuit 610 or the semiconductor component 612 (e.g., the PLD). The design of the circuit 610 or the semiconductor component 612 may be stored on the storage medium 604 in a file format such as GDSII or GERBER. The storage medium 604 may be a CD-ROM, DVD, hard disk, flash memory, or other appropriate device. Furthermore, the design workstation 600 includes a drive apparatus 603 for accepting input from or writing output to the storage medium 604.

Data recorded on the storage medium 604 may specify logic circuit configurations, pattern data for photolithography masks, or mask pattern data for serial write tools such as electron beam lithography. The data may further include logic verification data such as timing diagrams or net circuits associated with logic simulations. Providing data on the storage medium 604 facilitates the design of the circuit 610 or the semiconductor component 612 by decreasing the number of processes for designing semiconductor wafers.

Example Aspects

Aspect 1: An interrupt routing method, comprising: receiving an incoming interrupt; and assigning the incoming interrupt to a selected processor core of a set of processor cores based on a current processor running state of each processor core of the set of processor cores, the current processor running state of each processor core indicating whether a respective processor core is running a routine preventing processing of the incoming interrupt.

Aspect 2: The method of Aspect 1, in which the incoming interrupt specifies a target processing core, and the method further comprises rerouting the incoming interrupt to a next processor core in response to the incoming interrupt not being serviced by the target specific processing core within a predetermined period of time.

Aspect 3: The method of Aspect 1 or 2, further comprising setting the current processor running state in response to the selected processor core servicing the incoming interrupt.

Aspect 4: The method of any of the preceding Aspects, further comprising receiving the current processor running state from each core specific interrupt controller corresponding to each processor core of the set of processor cores.

Aspect 5: The method of any of the preceding Aspects, further comprising storing the current processor state in an interrupt controller field of a per processor core hardware register.

Aspect 6: The method of any of the preceding Aspects, further comprising: checking a virtual central processing unit (vCPU) state of a vCPU corresponding to the selected processor core; and routing the incoming interrupt to an available vCPU in response to the vCPU state indicating the vCPU is scheduled to another virtual machine.

Aspect 7: The method of any of the preceding Aspects, further comprising rerouting the incoming interrupt to a next vCPU in response to the incoming interrupt not being serviced by the available vCPU within a predetermined period of time.

Aspect 8: The method of any of the preceding Aspects, further comprising routing the incoming interrupt to the vCPU corresponding to the selected processor core in response to the vCPU state indicating the vCPU is not running an interrupt request (IRQ) masked routine.

Aspect 9: An apparatus for interrupting routing, comprising: at least one memory; and at least one processor coupled to the at least one memory, the at least one processor configured: to receive an incoming interrupt; and to assign the incoming interrupt to a selected processor core of a set of processor cores based on a current processor running state of each processor core of the set of processor cores, the current processor running state of each processor core indicating whether a respective processor core is running a routine preventing processing of the incoming interrupt Aspect 10: The apparatus of Aspect 9, in which the incoming interrupt specifies a target processing core, and the method further comprises rerouting the incoming interrupt to a next processor core in response to the incoming interrupt not being serviced by the target specific processing core within a predetermined period of time.

Aspect 11: The apparatus of Aspect 9 or 10, in which the at least one processor is further configured to set the current processor running state in response to the selected processor core servicing the incoming interrupt.

Aspect 12: The apparatus of any of the methods 9-11, in which the at least one processor is further configured to receive the current processor running state from each core specific interrupt controller corresponding to each processor core of the set of processor cores.

Aspect 13: The apparatus of any of the methods 9-12, in which the at least one processor is further configured to store the current processor state in an interrupt controller field of a per processor core hardware register.

Aspect 14: The apparatus of any of the methods 9-13, in which the at least one processor is further configured: to check a virtual central processing unit (vCPU) state of a vCPU corresponding to the selected processor core; and to route the incoming interrupt to an available vCPU in response to the vCPU state indicating the vCPU is scheduled to another virtual machine.

Aspect 15: The apparatus of any of the methods 9-14, in which the at least one processor is further configured to reroute the incoming interrupt to a next vCPU in response to the incoming interrupt not being serviced by the available vCPU within a predetermined period of time.

Aspect 16: The apparatus of any of the methods 9-15, in which the at least one processor is further configured to route the incoming interrupt to the vCPU corresponding to the selected processor core in response to the vCPU state indicating the vCPU is not running an interrupt request (IRQ) masked routine.

Aspect 17: A non-transitory computer-readable medium having program code recorded thereon, the program code executed by a processor and comprising: program code to receive an incoming interrupt; and program code to assign the incoming interrupt to a selected processor core of a set of processor cores based on a current processor running state of each processor core of the set of processor cores, the current processor running state of each processor core indicating whether a respective processor core is running a routine preventing processing of the incoming interrupt Aspect 18: The non-transitory computer-readable medium of Aspect 17, in which the incoming interrupt specifies a target processing core, and the method further comprises rerouting the incoming interrupt to a next processor core in response to the incoming interrupt not being serviced by the target specific processing core within a predetermined period of time.

Aspect 19: The non-transitory computer-readable medium of Aspect 17 or 18, in which the program code comprises program code to set the current processor running state in response to the selected processor core servicing the incoming interrupt.

Aspect 20: The non-transitory computer-readable medium of any of the Aspects 17-19, in which the program code comprises program code to receive the current processor running state from each core specific interrupt controller corresponding to each processor core of the set of processor cores.

For a firmware and/or software implementation, the methodologies may be implemented with modules (e.g., procedures, functions, and so on) that perform the functions described. A machine-readable medium tangibly embodying instructions may be used in implementing the methodologies described. For example, software codes may be stored in a memory and executed by a processor unit. Memory may be implemented within the processor unit or external to the processor unit. As used, the term "memory" refers to types of long term, short term, volatile, nonvolatile, or other memory and is not limited to a particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include random access memory (RAM), read-only memory (ROM), electrically erasable read-only memory (EEPROM), compact disc read-only memory (CD-ROM) or other optical disk storage, magnetic disk storage or other magnetic storage devices, or other medium that can be used to store desired program code in the form of instructions or data structures and that can be accessed by a computer. Disk and disc, as used, include compact disc (CD), laser disc, optical disc, digital versatile disc (DVD), floppy disk, and Blu-ray® disc, where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communications apparatus. For example, a communications apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions, and alterations can be made without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above, and below may refer to sides of a substrate or electronic device. Moreover, the scope of the present disclosure is not intended to be limited to the particular configurations of the process, machine, manufacture, composition of matter, means, methods, and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding configurations described may be utilized according to the present disclosure. Accordingly, the appended claims are intended to include within their scope such processes, machines, manufacture, compositions of matter, means, methods, or steps.

Those of skill would further appreciate that the various illustrative logical blocks, modules, circuits, and algorithm steps described in connection with the present disclosure may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in RAM, flash memory, ROM, erasable programmable read-only memory (EPROM), EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the present disclosure is provided to enable any person skilled in the art to make or use the present disclosure. Various modifications to the disclosure will be readily apparent to those skilled in the art, and the generic principles defined may be applied to other variations without departing from the spirit or scope of the disclosure. Thus, the present disclosure is not intended to be limited to the examples and designs described, but is to be accorded the widest scope consistent with the principles and novel features disclosed.

What is claimed is:

1. An interrupt routing method, comprising:

receiving an incoming interrupt in a hypervisor; and assigning the incoming interrupt by the hypervisor to a selected processor core of a set of processor cores based on a current processor running state of each processor core of the set of processor cores, the current processor running state of each processor core indicating whether a respective processor core is running a routine preventing processing of the incoming interrupt.

2. The method of claim 1, in which the incoming interrupt specifies a target processing core, and the method further comprises rerouting the incoming interrupt to a next processor core in response to the incoming interrupt not being serviced by the target specific processing core within a predetermined period of time.

3. The method of claim 1, further comprising setting the current processor running state in response to the selected processor core servicing the incoming interrupt.

4. The method of claim 1, further comprising receiving the current processor running state from each core specific interrupt controller corresponding to each processor core of the set of processor cores.

5. The method of claim 4, further comprising storing the current processor state in an interrupt controller field of a per processor core hardware register.

6. The method of claim 1, further comprising:

checking a virtual central processing unit (vCPU) state of a vCPU corresponding to the selected processor core; and routing the incoming interrupt to an available vCPU in response to the vCPU state indicating the vCPU is scheduled to another virtual machine.

7. The method of claim 6, further comprising rerouting the incoming interrupt to a next vCPU in response to the incoming interrupt not being serviced by the available vCPU within a predetermined period of time.

8. The method of claim 6, further comprising routing the incoming interrupt to the vCPU corresponding to the selected processor core in response to the vCPU state indicating the vCPU is not running an interrupt request (IRQ) masked routine.

9. An apparatus for interrupting routing, comprising:

at least one memory; and at least one processor coupled to the at least one memory, the at least one processor configured:

to receive an incoming interrupt; and to assign the incoming interrupt to a selected processor core of a set of processor cores based on a current processor running state of each processor core of the set of processor cores, the current processor running state of each processor core indicating whether a respective processor core is running a routine preventing processing of the incoming interrupt.

10. The apparatus of claim 9, in which the incoming interrupt specifies a target processing core, and the at least one processor is further configured to reroute the incoming interrupt to a next processor core in response to the incoming interrupt not being serviced by the target specific processing core within a predetermined period of time.

11. The apparatus of claim 9, in which the at least one processor is further configured to set the current processor running state in response to the selected processor core servicing the incoming interrupt.

12. The apparatus of claim 9, in which the at least one processor is further configured to receive the current processor running state from each core specific interrupt controller corresponding to each processor core of the set of processor cores.

13. The apparatus of claim 12, in which the at least one processor is further configured to store the current processor state in an interrupt controller field of a per processor core hardware register.

14. The apparatus of claim 9, in which the at least one processor is further configured:

to check a virtual central processing unit (vCPU) state of a vCPU corresponding to the selected processor core; and to route the incoming interrupt to an available vCPU in response to the vCPU state indicating the vCPU is scheduled to another virtual machine.

15. The apparatus of claim 14, in which the at least one processor is further configured to reroute the incoming interrupt to a next vCPU in response to the incoming interrupt not being serviced by the available vCPU within a predetermined period of time.

16. The apparatus of claim 14, in which the at least one processor is further configured to route the incoming interrupt to the vCPU corresponding to the selected processor core in response to the vCPU state indicating the vCPU is not running an interrupt request (IRQ) masked routine.

17. A non-transitory computer-readable medium having program code recorded thereon, the program code executed by a processor and comprising:

program code to receive an incoming interrupt; and program code to assign the incoming interrupt to a selected processor core of a set of processor cores based on a current processor running state of each processor core of the set of processor cores, the current processor running state of each processor core indicating whether a respective processor core is running a routine preventing processing of the incoming interrupt.

18. The non-transitory computer-readable medium of claim 17, in which the incoming interrupt specifies a target processing core, and the program code further comprises program code to reroute the incoming interrupt to a next processor core in response to the incoming interrupt not being serviced by the target specific processing core within a predetermined period of time.

19. The non-transitory computer-readable medium of claim 17, in which the program code comprises program code to set the current processor running state in response to the selected processor core servicing the incoming interrupt.

20. The non-transitory computer-readable medium of claim 17, in which the program code comprises program code to receive the current processor running state from each core specific interrupt controller corresponding to each processor core of the set of processor cores.

* * * * *